United States Patent [19]

Holland-Letz

[11] 4,158,456
[45] Jun. 19, 1979

[54] DEVICE FOR SEPARATING DOCUMENTS, CARDS AND THE LIKE, ESPECIALLY PAPER MONEY BILLS

[75] Inventor: Günter Holland-Letz, Hirschhorn, Fed. Rep. of Germany

[73] Assignee: Nixdorf Computer AG, Paderborn, Fed. Rep. of Germany

[21] Appl. No.: 861,943

[22] Filed: Dec. 19, 1977

[51] Int. Cl.² ............................................. B65H 3/06
[52] U.S. Cl. .................................... 271/118; 271/122; 271/125
[58] Field of Search ............... 271/110, 111, 117, 118, 271/121, 122, 125, 265

[56] References Cited

U.S. PATENT DOCUMENTS

| 650,410 | 5/1900 | Morin | 271/121 |
| 3,825,248 | 7/1974 | Friend | 271/122 |

*Primary Examiner*—Richard A. Schacher
*Attorney, Agent, or Firm*—Krass & Young

[57] ABSTRACT

An apparatus for singly conveying sheets of paper, especially currency, from a supply stack to an outlet, including a counter-rotating roller and a braking roller for separating two or more sheets which adhere to one another. Control elements delay new sheet take-up whenever adhering sheets are separated from one another, thus creating necessary space in the conveyance path.

19 Claims, 6 Drawing Figures

DEVICE FOR SEPARATING DOCUMENTS, CARDS AND THE LIKE, ESPECIALLY PAPER MONEY BILLS

INTRODUCTION

The invention relates to a device for separating documents, cards and the like, especially paper money bills, which are taken up by at least one intake roller from one supply pile and are conveyed by means of conveying rollers serving for the conveying and taking up of the documents to a document outlet, wherein a separating device with at least one separating roller preventing the further conveying of double or multiple documents is provided in the conveying line.

BACKGROUND OF THE INVENTION

In the known devices, German Pat. No. 1,208,535, by which documents are withdrawn from a supply pile and are conveyed separately to a document outlet, there is the difficulty that because of the adhesion existing between document surfaces lying one on another, two or more documents are often taken off at the same time and conveyed to the document outlet. Such a double or multiple document issuance renders impossible any further systematic treatment of the documents, e.g. in the processing equipment arranged in sequence after the document outlet.

In order to prevent any such undesirable multiple conveying of documents, the principle is known, U.S. Pat. No. 1,955,066, of providing a separating roller in the conveying line, which roller rotates counter to the conveying direction, and thereby when two documents lying one on another pass through, it then retains one of these, while the document not in contact with the separating roller is conveyed further without hindrance. It has been found in practice that such a counter-rotating separating roller is often not sufficient to separate reliably double or multiple documents adhering to one another.

BRIEF SUMMARY OF THE INVENTION

The present invention therefore takes as its task to design a device of the type mentioned at the outset in such a way that any conveying of double or multiple documents along the conveying line up to the document outlet is reliabily prevented, even when the conventional separating equipment does not reliably insure a separation of the documents adhering to one another.

This problem is solved according to the invention by providing, in the conveying line between the intake roller and a take-up roller arranged before the document outlet, in addition to the separating roller, at least one braking roller arranged after it in the conveying line, which braking roller, when the document is conveyed through the conveying gap between the braking roller and the driven conveying roller in the conveying direction, follows along with this, but at a lower circumferential speed than the conveying speed. Thus, if a double or multiple document should run unseparated through the separating gap between separating roller and conveying roller, then the document is reliably separated in the conveying gap between the slowly running braking roller and the faster running conveying roller, as soon as the documents adhering together reach this conveying gap. This offers the advantage that the double document coming in contact with the circumferential surface of the braking roller lags behind the document in contact with the conveying roller by a predetermined amount, e.g., by 25%, and that after the latter document has been conveyed to the outlet point for the document, the former document is conveyed along the conveying line subsequently.

A further improvement of the device according to the invention is given by providing a first control element actuatable by the conveyed document in the region of the conveying gap between the braking roller and the conveying roller, and a second control element actuatable by the document in the region of a later take-up gap between the take-up roller and the conveying roller, and making the intake roller capable of being lifted up off the supply pile as a result of the actuation of the first control element and the braking roller capable of being lifted up off the conveyed document as a result of the actuation of the second switching element. In this manner it is managed that the starting up of the carrying rollers which bring about the conveying of the documents is controlled in dependence on the documents covering a predetermined distance. When the conveying gap between braking roller and conveying roller is reached, the intake of a new document is first prevented by the lifting off of the intake roller, while the document located in the conveying line is conveyed up to the take-up roller and then, after the braking roller is lifted, it is transferred without hindrance from the take-up roller to the document outlet.

An alternative further improvement in the invention is also given by providing, in the region of the conveying gap between the braking roller and conveying roller, a first control element actuatable by the conveyed document, and providing, in the region of a take-up gap placed further on between take-up roller and conveying roller, a second control element actuatable by the document, and having the motor-driven intake roller switched to idle running as a result of the actuation of the first control element and having it locked as a result of the actuation of the second control element. Herewith the intake of a new document is prevented by the actuation of the first control element, while with the actuation of the second circuit element the double document lagging by 25%, for example, through the action of the braking roller is retained long enough by the locked intake roller in contact with the supply pile and prevented from further conveying until the document in contact with the conveying roller has run through the take-up roller.

According to a further refinement of the invention, the length of the conveying line between a pressure plate with friction lining arranged on the intake side of the supply pile, and the take-up roller, corresponds to the length of the document measured in the conveying direction. For adaptation to different lengths of documents, the pressure plate is movable and is mounted in a manner such as to be adjustable to the length of the particular document. In this way it is managed that a double document adhering to the single document to be conveyed reliably remains with its back end in the region of the locked intake roller or in the region of the friction lining which prevents its further conveying, and is released for further conveying only after the correct conveying of the individual document is achieved.

According to another refinement of the invention, the intake roller, which is pressed by spring loading against the supply pile and can be lifted from the supply pile by actuation of the first control element, raises up the particular document which is first in line from the friction lining of the pressure plate. The lifting of the intake roller from the supply pile, which is controlled by the control element, causes a double document improperly conveyed along with it to be pressed down onto the friction lining of the pressure plate and prevents its further conveying.

According to a further development of the above-mentioned alternative solution, the intake roller in the region of the intake side of the supply pile is mounted so as to be adjustable, relative to the take-up roller, to the particular length of the document as measured in the conveying direction. As compared with the aforementioned solution with the pressure plate which shows a friction lining an is adjustable to the particular length of the document, this solution shows the advantage of a larger range of adjustment, since in this solution the double document carried along is retained solely by the intake roller which contacts the double document in practically a straight line.

According to a further development of the invention the braking motor is coupled with a motor drive which drives the braking roller at a circumferential speed of about 75% of the conveying speed of the conveying rollers. For this it is advantageous to arrange a slipping clutch between the drive and the braking roller, the slide torque of which clutch amounts to about 70% of the torque transmitted by the one single receipt to the peripheral surface of the braking roller. This insures that in the first place a double document erroneously carried along and not separated by the separating roller lags behind the correctly conveyed document by about 25% and thus remains in the contact region of the friction lining or the intake roller. On the other hand, the slipping clutch insures that a single document can pass through the conveying line practically without slippage, but that a double document erroneously carried along is reliably prevented from being conveyed further. According to an alternative solution of the invention, the braking roller is mounted in idle-running form and is under the influence of a braking device. In this way any special drive for the braking roller becomes superfluous.

The above-mentioned switching elements are preferably designed as light barriers, which for safety reasons are present as double units. But control elements of another type, e.g. mechanical contact switches or the like, can be provided within the scope of the invention.

BRIEF DESCRIPTION OF THE DRAWINGS

In the following, examples of the embodiments represented in the drawings are described.

They show the following.

DETAILED DESCRIPTION OF THE ILLUSTRATIVE EMBODIMENTS

Figure 1:
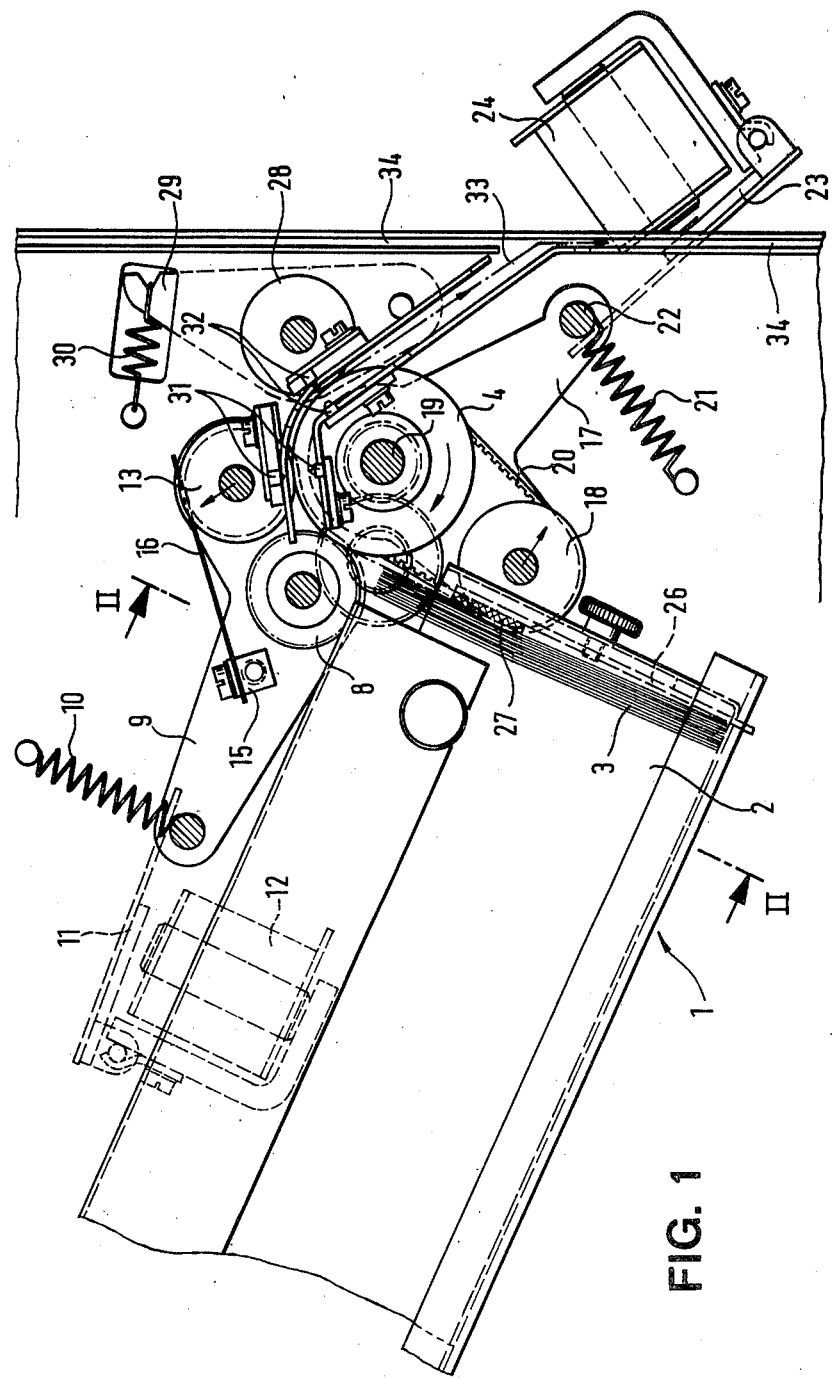
FIGS. 1 and 2 show a first example of an embodiment of the device according to the invention in a side elevation and a sectional view along the section line II—II.
Figure 2:
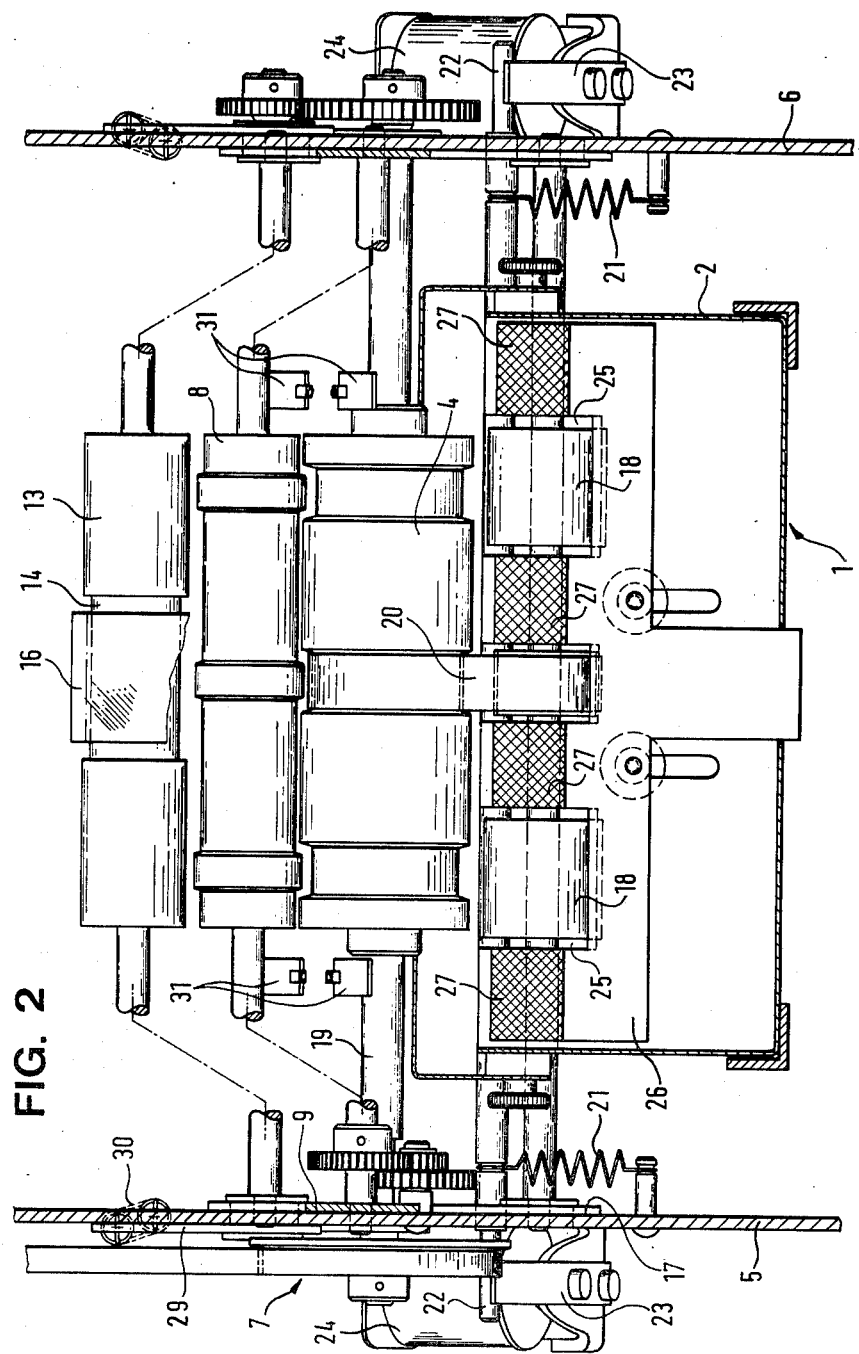

In the embodiment example according to FIGS. 1 and 2, 1 designates a supply pile consisting of a housing 2 which is open at least partly on one side, in the interior of which are stacked together documents 3, for example, bills, checks or the like. Reference 4 designates a main conveying roller which is mounted on both sides in side plates 5, 6 and is coupled by way of a drive 7 not otherwise described, e.g. a belt drive, with an electric driving motor. For the purpose of better visibility, in FIG. 2 the successively described rollers are drawn next to one another with reference lines to their support positions in the side plates 5, 6, whereas in actuality according to FIG. 1 they are situated partly one behind another. Parallel to the main conveying roller 4 is mounted a separating roller 8 which is coupled with the aforementioned drive in such a way that when the conveying roller 4 is driven in a clockwise direction, the separating roller describes a slop opposite rotating motion in a clockwise direction. The bearing shaft of the separating roller 8 also at the same time forms the bearing shaft for a rocking lever 9 which interacts with the armature plate 11 of a swinging armature magnet 12 in such a way that when the swinging magnet 12 is excited, the rocking lever is swung in a counterclockwise direction counter to the force of a tension spring 10. Mounted on the rocking lever 9 is a braking roller 13 with a central recess 14 of reduced diameter as well as a braking device for the braking roller 13 represented by leaf springs 16 fixed by one end at 15, the free flexible end of which makes contact with the circumferential surface in the recess 14. The braking roller 13 is arranged parallel to the conveying roller 4. On another rocking lever 17 mounted on the bearing shaft 19 of the conveying roller 4 is mounted an intake roller 18 which is coupled with the drive of the conveying roller 4 by way of a belt drive 20. Similarly as with the rocking lever 9, this rocking lever is also put under stress by tension springs 21, in the present case against the document first in line in the supply pile 1. Likewise, two side bolts 22 project into the region of the anchor plates 23 from the swinging armature magnets 24 mounted on the side plates 5, 6. As the figures show, peripheral parts of the intake roller 18 protrude at the position shown through cutaway portions 25 onto the pressure plate 26 which bounds the supply pile 1 in the direction of the intake roller 18, far enough to make contact with the document 3 first in line. Upon actuation of the magnet 24, the rocking lever 17 is swung in a counterclockwise direction, thereby lifting the intake roller 18 from the supply pile 1 in the direction of the arrow. The pressure plate 26 carries a friction lining 27 in the region of the upper end of the supply pile 1 as shown in the drawing which lining is for example made of a material known under the trade name of "Vulkollan". Finally, a take-up roller not further represented is designated as 28 in FIG. 2 which is mounted on a lever 29 supported on one side and is pressed by a spring 30 against the conveying roller 4. The take-up roller 28 is driven in a counterclockwise direction but at the same circumferential speed as the conveying roller 4. In the plane passing through the axes of rotation of the braking roller 13 and the conveying roller 4 is arranged a first control element 31 in the form of a photoelectric light barrier in pairs on opposite sides of the roller, while a second similar control element 32 is arranged just before the plane passing through the axes of rotation of the take-up roller 28 and the conveying roller 4.

In the following the mode of operation of the device is explained:

The documents 3 are conveyed in the embodiment example in the conveying line designated by the conveying roller 4 on the one hand and by the rollers designated as 8, 13 and 28 on the other hand. The length of the conveying line between the upper edge of the pressure plate and the take-up roller 28 corresponds to the length of the document to be transported as measured in the conveying direction. In order to make possible adaptation to different lengths of documents, the pressure plate 26 or the friction lining 27 is mounted on the housing 2 in movable form. The driven intake roller 18 causes the document 3 first in line to be conveyed into the gap between conveying roller 4 and separating roller 8. Any adhering second document 3 is prevented from being conveyed further by the opposing separating roller 8. The document 3 then reaches the conveying gap between conveying roller 4 and the freely rotating braking roller 13 which is under the influence of the braking device. The braking torque between the braking roller 13 and the leaf spring 16 is about 70% to 80% of the torque transmitted from one single document 3 to the outer peripheral surface of the braking roller 13 which s supported in flexible form on the document 3. That is, a single document lets the braking roller run along, but if a second document adheres, the braking roller 13 stands still upon the intake of the double document, since a lower force can be transmitted from document to document. Herewith the double document at least is still located in the region of the friction lining 27, and therefore is blocked by this from being conveyed further. Thereby, the friction lining-document and document-document torque difference is advantageously utilized. When the individual document 3 passes through the first control element 31, the latter carries out a switching operation whereby the magnets 24 are actuated through a control device which is not represented, through which the intake roller 18 is lifted off the supply pile. In this way the intake of a further document 3 into the conveying line does not occur. The double document which is erroneously carried along is reliably retained by the friction lining 27, while the correctly conveyed single document 3 reaches the take-up gap between take-up roller 28 and conveying roller 4, wherewith by the actuation of the second control element 32 the magnet 12 is excited and the braking roller 13 is lifted off. Thereby the single document is now driven only by the take-up roller 28 and is conveyed in an inclined document outlet 33 placed further on and from there on out is conveyed into a collecting channel 34 which is vertical for example.

Figure 3:
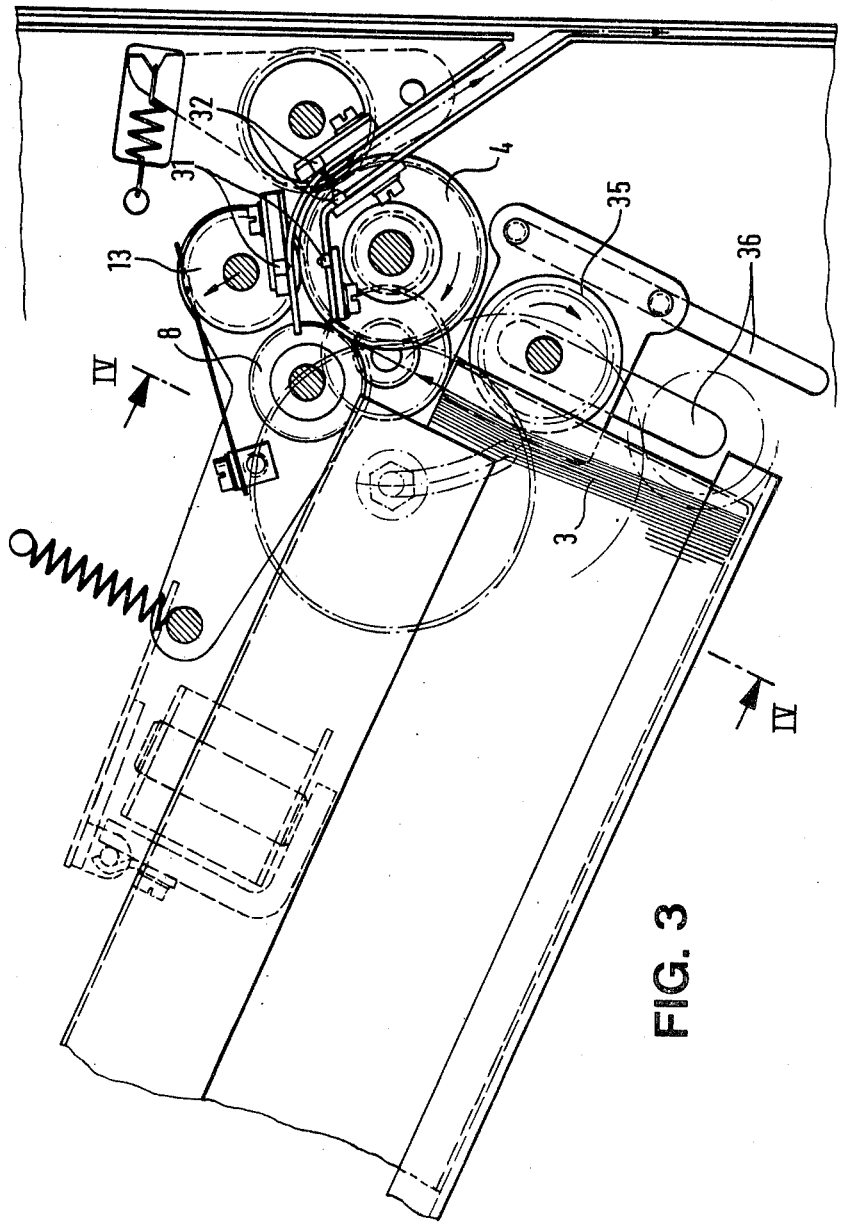
FIGS. 3 and 4 show a second example of an embodiment of the device according to the invention in a side elevation and a sectional view along the section line IV—IV.
Figure 4:
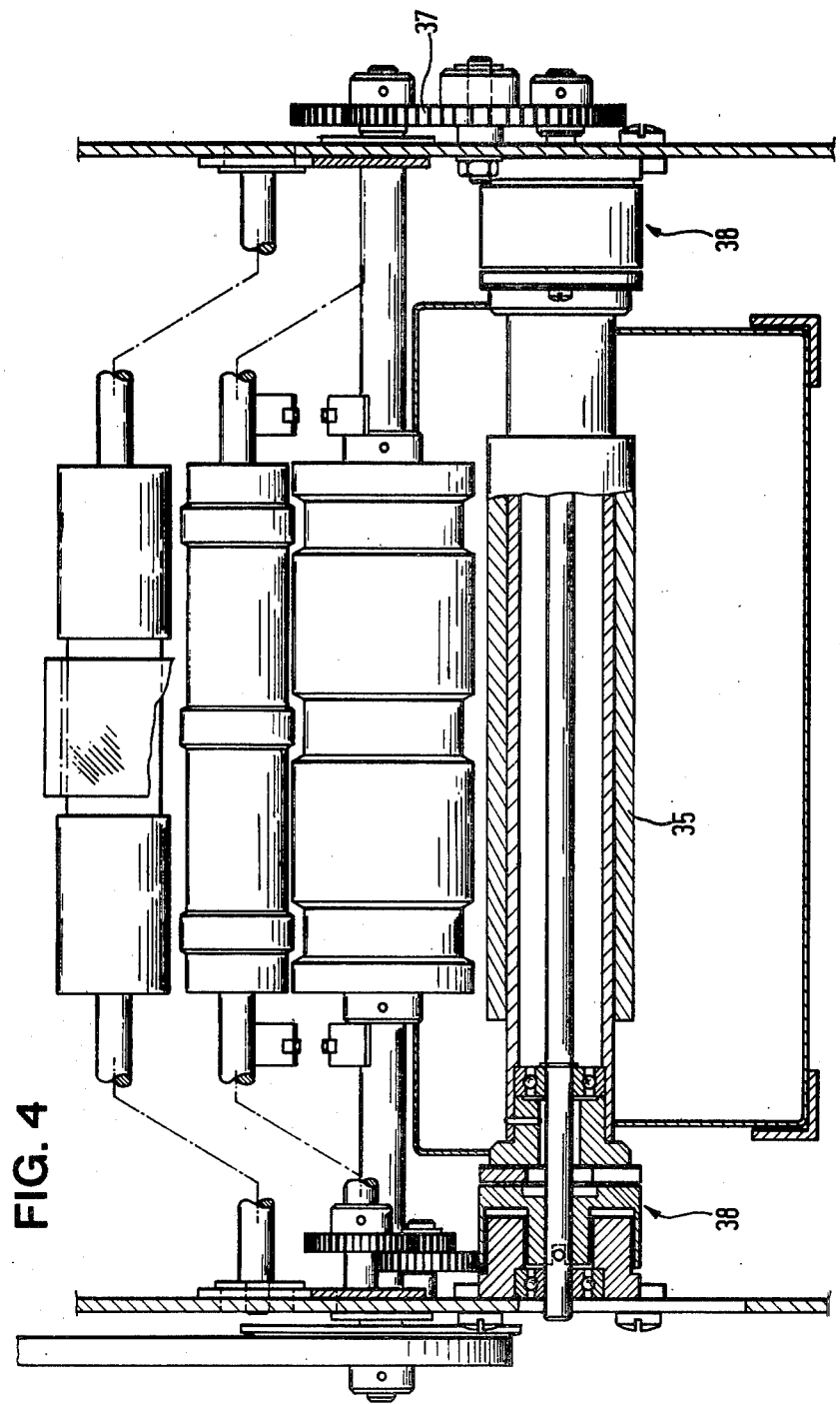

The substantial difference between the embodiment example described and the embodiment example according to FIGS. 3 and 4 is that the intake roller 35 is not arranged on a rocking lever and need not be lifted off the supply pile. In this device, moreover, a friction lining on the upper end of the pressure plate is eliminated. The take-up roller 35 is mounted along a slotted hole guide 36 parallel to the front side of the supply pile in adjustable form. It is driven by way of a controllable idler 37 and an electromagnetic clutch 38 by a drive motor which is not further represented. The intake roller 35 conveys the document 3 along the separating roller 8 up to the first switching element 31 between the braking roller 13 and the conveying roller 4. The first control element switches the intake roller 35 to idle running by means of the electromagnetic clutch 38. When the document 3 passes through the second control element 32 the intake roller 35 is brought to a stop by means of an electromagnetic brake. The contact pressure between the stopped roller 35 and the supply pile is sufficient to hold back any double document which might have been carried along. Here the contact pressure is concentrated on a small region of the roller and for this reason it is especially high. The rest of the parts of the device correspond with those of the device according to FIGS. 1 and 2 and therefore are not discussed separately.

Figure 5:
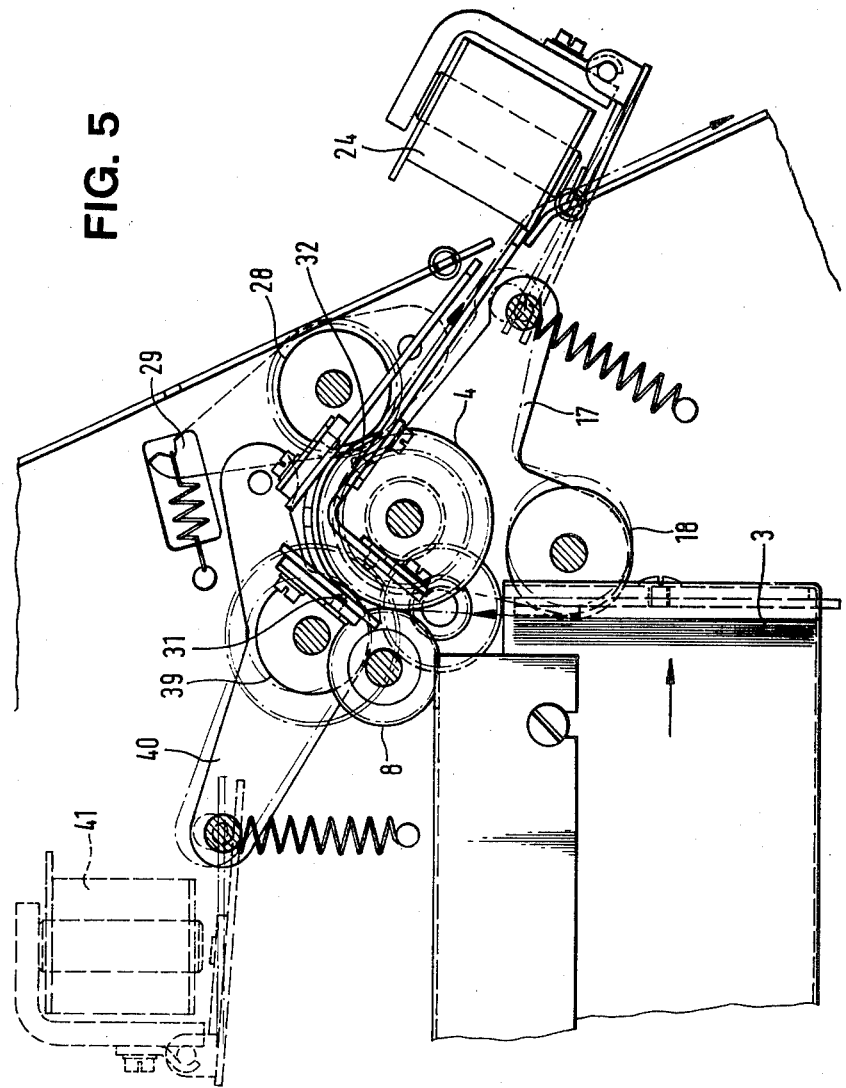
FIG. 5 shows a third example of an embodiment of the device in a side elevation.

The embodiment example according to FIG. 5 differs from the embodiment example according to FIGS. 1, 2 essentially in a different design of the braking roller 39. The rest of the parts of the device, namely the separating roller 8, the conveying roller 4, the take-up roller 28, the intake roller 18, the rocking levers 17 and 29 for the intake roller and take-up roller as well as the actuating magnet 24 for the rocking lever 17 are arranged analogously to FIGS. 1, 2 and have the same function. The first and second circuit elements in the form of light barriers are in turn designated as 31 and 32, which barriers are likewise arranged between the braking roller 39 and conveying roller 4 or between the take-up and conveying roller. The braking roller 39, likewise arranged on a rocking lever 40 and interacting with a swinging armature magnet 41, is driven in a counter-clockwise direction by a driving motor which is not shown, that is, in the conveying direction, but at a circumferential speed which is only about 75% of the circumferential speed of the conveying roller 4. Between the above-mentioned drive and the braking roller 39 is arranged a slipping clutch, the slide torque of which is about 70% of the torque transmitted by a single document 3 to the circumferential surface of the braking roller 39.

When the device is operated, the bill is conveyed from the intake roller 18 into the gap between the separating roller 8 and conveying roller 4 until it reaches the conveying gap between braking roller 39 and conveying roller 4. When the first control element 31 is reached, the magnet 24 is excited through a control device not further represented, whereby the intake roller 18 is lifted off of the supply pile. As soon as a double document adhering to the single document has passed the separating roller 8, this double document comes into contact with the braking roller 39 running at a reduced speed and is retained by about 25% with respect to the correctly conveyed single document. Thus the two documents are reliably separated from one another. As soon as the front edge of the document 3 lying on the conveying roller 4 reaches the second control element 32, the swinging armature magnet 41 is excited and the rocking lever 40 together with the braking roller 39 is lifted from the conveying line. The document first in line can now be carried further by the take-up roller 28 along and fed to the document outlet or into the collecting channel. During the taking-up of the single document, the double document lagging by 25% is still easily retained by the pressure plate at the level of the intake roller 18. The device may contain a testing and control device, not further represented, which in the presence of a double or multiple document at the level of the first control element allows a dropping of only the braking roller 39 onto the conveying line, and in the presence of no document allows the dropping of the intake roller 18 and the braking roller 39 onto the supply pile or onto the conveying line. As soon as the correctly conveyed document has reached the collecting container, the drive for all the rollers is switched off. If it is wished to deliver a plurality of documents, then after the second control element 32 is released the intake roller 18 is again pressed against the supply pile, wherewith the drive runs continuously.

Figure 6:
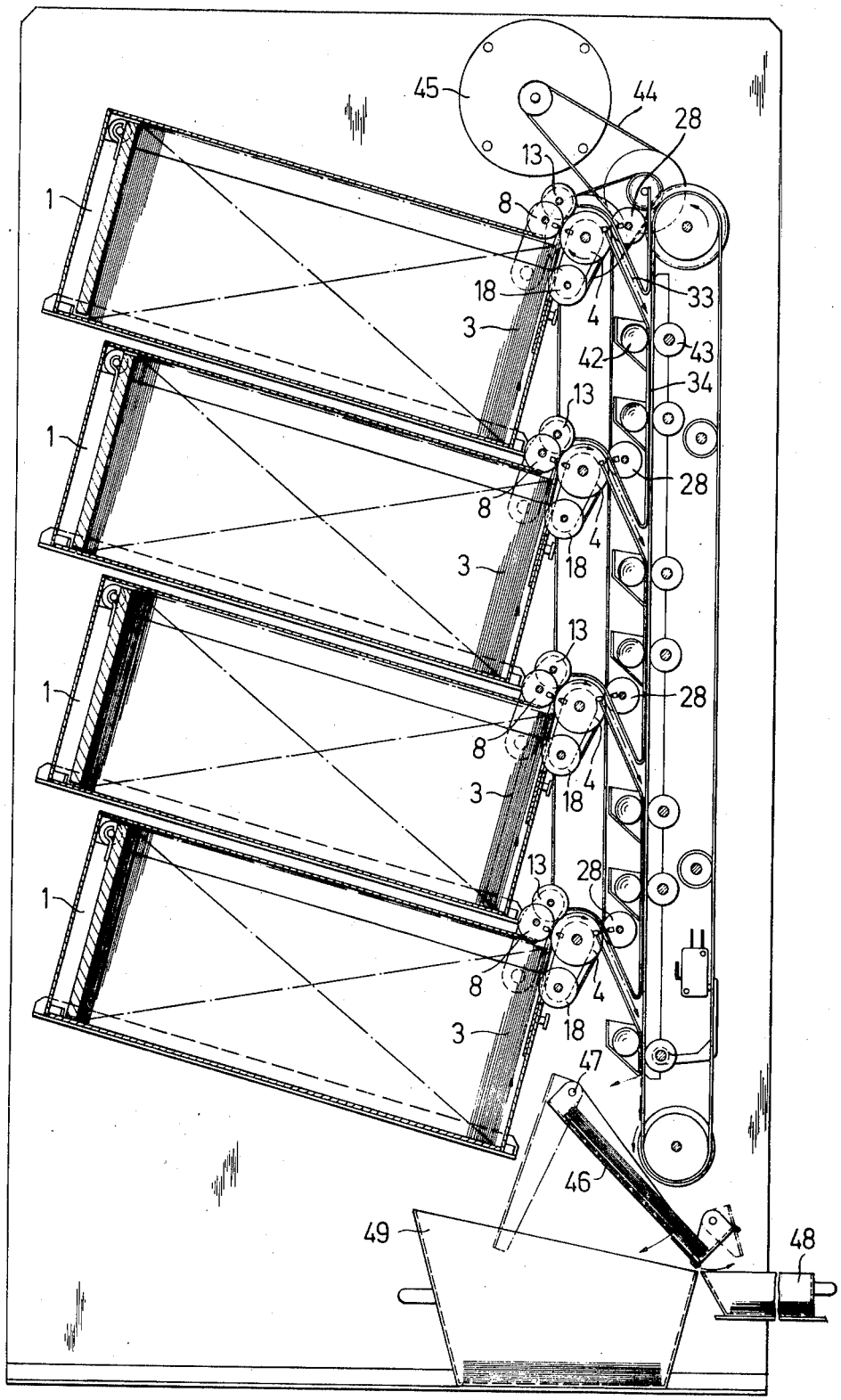
FIG. 6 shows the diagrammatic representation of a unit for separating and collecting documents which contains a number of devices according to FIG. 1 to 5.

In the embodiment example according to FIG. 6 are arranged a plurality of devices of the type described, each consisting for example of the supply pile 1, conveying roller 4, intake and take-up roller 18 or 28, separating roller 8, braking roller 13 and the like arranged alongside a collecting channel 34 in which the document outlets 33 of the separate devices empty. The documents 3 are guided into the collecting channel 34 by pressure and guide elements 42, 43. A conveyor belt driven by a driving motor 45 for conveying the documents 3 into the collecting channel 34 is designated as 44. The documents 3 are deposited in an intermediate repository 46 rotatable around the center of rotation 47, and from there they are distributed as a pile in a delivery container 48 or else in a reject container 49. The intermediate repository arranged at the end of the collecting channel can be controlled as a function of the thickness of the pile collected, for example by a measuring device which causes the intermediate repository to be emptied either into the delivery container 48 or else into the reject container 49.

It is to be understood that the invention has been described with reference to specific illustrative embodiments and that the foregoing description is not to be construed in a limiting sense.

The embodiments of the invention in which an exclusive property or privilege is claimed are defined as follows:

1. Device for separating documents, cards and the like, especially paper money bills, which are taken up by at least one intake roller from a supply pile and by way of conveying rollers serving for the conveying and taking up of documents are carried to a document outlet, wherein a separating device with at least one separating roller preventing the further conveying of double or multiple documents is provided in the conveying line, characterized in that in the conveying line between the intake roller and a take-up roller arranged before the document outlet, in addition to the separating roller, at least one braking roller is provided which is arranged after this separating roller in the conveying line, which runs along when the document is conveyed through the conveying gap between braking roller and driven conveying roller in the conveying direction, but at a lower circumferential speed as compared with the conveying speed.

2. Device as set forth in claim 1, characterized in that in the region of the conveying gap between braking roller and conveying roller is provided a first circuit element which can be actuated by the conveyed document, and in the region of a later take-up gap between take-up roller and conveying roller a second circuit element is provided which can be actuated by the document, and that the intake roller can be lifted off the supply pile as a result of the actuation of the first circuit element, and the braking roller can be lifted off the conveyed document as a result of the actuation of the second circuit element.

3. Device as set forth in claim 1, characterized in that in the region of the conveying gap between braking roller and conveying roller is provided a first circuit element which can be actuated by the conveyed document, and in the range of a take-up gap further on between take-up roller and conveying roller is arranged a second circuit element which can be actuated by the document, and in that the motor-driven intake roller is switched to idle running as a result of the actuation of the first circuit element and is locked as a result of the actuation of the second circuit element.

4. Device as set forth in claim 1 further comprising a pressure plate arranged at the intake side of the supply pile and showing a friction facing, and the take-up roller corresponds to the length of the document measured in the conveying direction.

5. Device as set forth in claim 4, characterized in that the pressure plate is movable and mounted so as to be adjustable to the length of the particular document.

6. Device as set forth in claim 1, characterized in that the intake roller, pressed flexibly against the supply pile and capable of being lifted off the supply pile by the actuation of the first circuit element, lifts up the document which happens to be first in line from the friction lining for the conveying of the document.

7. Device as set forth in claim 3, characterized in that the intake roller in the region of the intake side of the supply pile is mounted to be adjustable, relative to the take-up roller, to the particular length of the document used as measured in the conveying direction.

8. Device as set forth in claim 1, characterized in that the braking roller is coupled with a motor drive which drives the braking roller at a circumferential speed of about 75% of the conveying speed of the conveying roller.

9. Device as set forth in claim 8, characterized in that a slipping clutch is arranged between drive and braking roller, the slide torque of which clutch is about 70% of the torque transmitted by a single document to the circumferential surface of the braking roller.

10. Device as set forth in claim 8, characterized in that the braking roller and sliding clutch are mounted on a rocking lever which can be swung away from the document conveying line by a swinging armature magnet actuatable by the control element.

11. Device as set forth in claim 1, characterized in that the braking roller is mounted for idle running and is under the influence of a braking device.

12. Device as set forth in claim 11, characterized in that a leaf spring preferably resting under tension on a circumferential surface of the braking roller with a reduced diameter is provided as a braking device, and that the slipping torque between leaf spring and circumferential surface is about 70% to 80% of the torque transmitted from a single document to the outer circumferential surface of the braking roller which rests with spring loading on the document.

13. Device as set forth in claim 11, characterized in that the braking roller and braking device are mounted on a rocking lever which can be swung out from the document conveying line by a swinging armature magnet actuated by the control element.

14. Device as set forth in claim 1, characterized in that the control elements are constructed preferably as pairs of light barriers distributed over the width of the document.

15. Device as set forth in claim 1, characterized in that the first control element is arranged in the plane passing through the axes of rotation of the braking roller and the opposite conveying roller.

16. Device as set forth in claim 1, characterized in that the second control element is arranged at a short distance before the plane passing through the axes of rotation of the take-up roller and the opposite conveying roller.

17. Device as set forth in claim 1 further comprising a testing and control device which only in the presence of a double or multiple document at the level of the first control element causes the dropping of the braking roller onto the conveying line and when no document is present causes the dropping of the intake roller and braking roller onto the supply pile or the conveying line.

18. Device as set forth in claim 1 wherein a document collecting channel leading to an intermediate or final repository is provided into which empty the document outlets of a plurality of devices consisting of intake, take-up, separating and conveying rollers.

19. Device as set forth in claim 18, characterized in that at the end of the collecting channel is arranged a measuring device reacting to a prescribed thickness or a prescribed weight of the pile of documents, which permits an emptying of the intermediate repositories.

* * * * *